(12) United States Patent
Lee et al.

(10) Patent No.: US 12,551,098 B2
(45) Date of Patent: Feb. 17, 2026

(54) CONTROLLER AND EYE-EXAMINING DEVICE HAVING THE SAME

(71) Applicant: Huvitz Co., Ltd., Anyang-si (KR)

(72) Inventors: Young Woo Lee, Anyang-si (KR); Jae Hong Mo, Anyang-si (KR)

(73) Assignee: Huvitz Co., Ltd., Anyang-si (KR)

( * ) Notice: Subject to any disclaimer, the term of this patent is extended or adjusted under 35 U.S.C. 154(b) by 452 days.

(21) Appl. No.: 18/185,829

(22) Filed: Mar. 17, 2023

(65) Prior Publication Data

US 2023/0329546 A1 Oct. 19, 2023

(30) Foreign Application Priority Data

Apr. 15, 2022 (KR) .......................... 10-2022-0046824
May 18, 2022 (KR) .......................... 10-2022-0060806

(51) Int. Cl.
*A61B 3/00* (2006.01)
*A61B 3/10* (2006.01)
(Continued)

(52) U.S. Cl.
CPC .......... *A61B 3/0075* (2013.01); *A61B 3/0016* (2013.01); *G05G 9/047* (2013.01);
(Continued)

(58) Field of Classification Search
CPC ................. A61B 3/0075; G05G 9/047; G05G 2009/0474–2009/04762; G05G 5/05;
(Continued)

(56) References Cited

U.S. PATENT DOCUMENTS 3,331,972 A * 7/1967 Waldemar ............ G01D 5/2046
244/236
3,463,579 A * 8/1969 Papritz ................... G02B 27/40
269/58
(Continued)

FOREIGN PATENT DOCUMENTS

CH 709563 A1 10/2015
DE 102014001630 A1 * 8/2015 ............... G05G 5/05
(Continued)

OTHER PUBLICATIONS

Office Action for counterpart Korean Patent Application No. 10-2022-0060806, dated Apr. 29, 2024.
(Continued)

*Primary Examiner* — Zachary W Wilkes
(74) *Attorney, Agent, or Firm* — United One Law Group LLC; Kongsik Kim; Jhongwoo Peck

(57) ABSTRACT

A stick controller for adjusting the position of an examination unit with respect to an eye to be examined in an ophthalmic eye-examining device includes an operation unit configured to be operated by a user so as to be positioned in a first driving area or a second driving area; a first magnetic coupling part coupled to the operation unit and configured to move along a first area together with the operation unit; a second magnetic coupling part detachably coupled to the first magnetic coupling part by magnetic force and configured to move along a second area; and a control signal generation unit configured to output a first drive control signal when the operation unit is positioned in the first driving area and output a second drive control signal when the operation unit is positioned in the second driving area.

6 Claims, 5 Drawing Sheets

(51) Int. Cl.
*G05G 9/047* (2006.01)
*G05G 5/05* (2006.01)

(52) U.S. Cl.
CPC .................. *A61B 3/10* (2013.01); *G05G 5/05* (2013.01); *G05G 2009/04718* (2013.01)

(58) Field of Classification Search
CPC ....... G05G 5/06; G06F 3/0205; G06F 3/0338; B25J 13/065
USPC ............ 351/200–247; 463/38; 600/101–183; 345/161
See application file for complete search history.

(56) References Cited

U.S. PATENT DOCUMENTS

| | | | | | |
|---|---|---|---|---|---|
| 4,161,726 | A | * | 7/1979 | Burson | G05G 9/047 341/20 |
| 4,489,303 | A | * | 12/1984 | Martin | H03K 17/97 74/543 |
| 4,500,867 | A | * | 2/1985 | Ishitobi | G01D 5/145 345/161 |
| 4,544,803 | A | | 10/1985 | Schaller | |
| 5,252,821 | A | * | 10/1993 | Sugimura | A61B 3/0075 250/221 |
| 5,675,359 | A | * | 10/1997 | Anderson | G05G 9/047 345/161 |
| 6,909,353 | B2 | * | 6/2005 | Romero Herrera | G05G 9/047 338/12 |
| 7,019,238 | B2 | * | 3/2006 | Kobayashi | B60Q 1/1469 200/310 |
| 7,489,296 | B2 | * | 2/2009 | Nishino | G06F 3/0338 345/157 |
| 7,654,670 | B2 | * | 2/2010 | Mimura | A61B 3/028 351/208 |
| 7,695,141 | B2 | * | 4/2010 | Hara | A61B 5/398 351/221 |
| 8,138,866 | B2 | * | 3/2012 | Kramlich | G05G 1/10 345/184 |
| 8,803,802 | B2 | * | 8/2014 | Hatanaka | G05G 5/05 345/161 |
| 8,845,102 | B2 | * | 9/2014 | Inoue | A61B 3/0075 351/208 |
| 9,247,868 | B2 | * | 2/2016 | Ogura | A61B 3/117 |
| 9,870,021 | B2 | * | 1/2018 | Olsson | G06F 3/0338 |
| 12,013,717 | B2 | * | 6/2024 | Beurdeley | G05G 5/05 |
| 2006/0267933 | A1 | * | 11/2006 | Tai | G06F 3/03548 345/157 |
| 2006/0290670 | A1 | * | 12/2006 | Ishimaru | G05G 5/05 345/161 |
| 2009/0079939 | A1 | | 3/2009 | Mimura | |
| 2010/0265176 | A1 | * | 10/2010 | Olsson | G06F 3/016 345/161 |
| 2023/0168706 | A1 | * | 6/2023 | Beurdeley | H01H 23/30 345/161 |

FOREIGN PATENT DOCUMENTS

| | | | |
|---|---|---|---|
| EP | 1046151 B1 | | 6/2017 |
| JP | H08185257 A | * | 7/1996 |
| JP | 2012-135556 A | | 7/2012 |
| JP | 2014-023960 A | | 2/2014 |

OTHER PUBLICATIONS

Extended European search report for counterpart EP Application No. 23162134.3, dated Aug. 17, 2023.

* cited by examiner

CONTROLLER AND EYE-EXAMINING DEVICE HAVING THE SAME

CROSS-REFERENCE TO RELATED APPLICATIONS

This application claims priority from Korean Application Nos. 10-2022-0060806, filed on May 18, 2022 and 10-2022-0046824, filed on Apr. 15, 2022. The aforementioned applications are incorporated herein by reference in their entireties.

TECHNICAL FIELD

The present disclosure relates to a controller, and more particularly, to a stick controller for adjusting the position of an examination unit with respect to an eye to be examined in an ophthalmic eye-examining device and an eye-examining device including the same.

RELATED ART

In general, an eye-examining device fixes the face of an examinee at a predetermined position, adjusts the position of an examination unit with respect to the eye to be examined, aligns the eye to be examined with the examination unit, and then examines the eye to be examined using the examination unit. FIG. 1 is a view showing the configuration of a conventional eye-examining device. As shown in FIG. 1, the conventional eye-examining device includes a base unit 10 having a headrest 12 for fixing the face of an examinee mounted thereto, an examination unit 14 that is mounted on the base unit 10 and moves forward and backward, left and right, and/or up and down with respect to the eye to be examined fixed to the headrest 12 and examines the eye to be examined, a drive unit (not shown) that is installed on the base unit 10 and moves the examination unit 14, and a controller 16 that moves the examination unit 14 to a desired position by controlling the drive unit. The drive unit may be a manual drive unit such as a gear that mechanically transmits the driving force of the controller 16 to the examination unit 14, or an electric drive unit that moves the examination unit 14 by electrically driving a motor according to a drive signal from the controller 16 (see Japanese Patent Application Publication No. 2014-23960).

In such an eye-examining device, it is necessary to drive the examination unit 14 in two different methods. For example, the position of the examination unit 14 can be precisely adjusted by a fine movement operation that drives the examination unit 14 at a slow speed, or the position of the examination unit 14 can be changed quickly by a coarse movement operation that drives the examination unit 14 at high speed. In addition, when finishing the coarse movement operation of the examination unit 14, it is necessary to restore the position of the controller 16 so that the examination unit 14 can quickly switch to the fine movement operation. To this end, Japanese Patent Application Publication No. 2014-23960 discloses a structure in which a coarse movement operation is performed when the tilt angle of the controller 16 is greater than a predetermined angle, and in this case, a restoring force is generated by using the elastic force of the spring so that the tilt angle of the controller 16 becomes equal to the predetermined angle. However, if the tilt angle of the controller 16 is restored by the elastic force of the spring, it is difficult to accurately adjust the restoring force, and thus, there may arise problems of device failures, such as the magnitude of the restoring force being variable for each eye-examining device and the restoring force being decreased over time.

SUMMARY

It is an object of the present disclosure to provide a controller that automatically returns to a predetermined position when no external force is applied at a position out of the predetermined position, and an eye-examining device including the same.

It is another object of the present disclosure to provide a controller in which the magnitude of a restoring force for restoring to a predetermined position is uniform in each device and the restoring force changes little over time, and an eye-examining device including the same.

It is still another object of the present disclosure to provide a controller in which a mechanical structure for generating a restoring force is simple and easy to produce, and which has less occurrences of failure, and an eye-examining device including the same.

In order to achieve the above objects, the present disclosure provides a controller 20 comprising: an operation unit 22 configured to be operated by a user so as to be positioned in a first driving area or a second driving area; a first magnetic coupling part 30 coupled to the operation unit 22 and configured to move along a first area 34 together with the operation unit 22; a second magnetic coupling part 40 detachably coupled to the first magnetic coupling part 30 by magnetic force and configured to move along a second area 44; and a control signal generation unit 28 configured to output a first drive control signal when the operation unit 22 is positioned in the first driving area and output a second drive control signal when the operation unit 22 is positioned in the second driving area, wherein the first area 34 includes the second area 44 so that a movement area of the first magnetic coupling part 30 includes a movement area of the second magnetic coupling part 40, the first magnetic coupling part 30 and the second magnetic coupling part 40, while being coupled to each other by the magnetic force, move within the second area 44 according to driving of the operation unit 22 when the operation unit 22 is in the second driving area, the first magnetic coupling part 30 moves to the first area 34 outside the second area 44 when the operation unit 22 is in the first driving area, the first magnetic coupling part 30 and the second magnetic coupling part 40 are separated from each other, and an attractive force resulting from the magnetic force is generated between the second magnetic coupling part 40 and the first magnetic coupling part 30.

In addition, the present disclosure provides an eye-examining device comprising: a base unit 10 having a headrest 12 for fixing the face of an examinee mounted thereto; an examination unit 14 mounted on the base unit 10 and configured to move in position with respect to an eye to be examined fixed to the headrest 12 and examine the eye to be examined; a drive unit installed on the base unit 10 and configured to move the examination unit 14; and the controller 20 described above configured to move the examination unit 14 to a desired position by controlling the drive unit.

In the controller according to the present disclosure, the magnitude of the restoring force for restoring to a predetermined position is uniform in each device when no external force is applied at a position out of the predetermined position, and the decrease of the restoring force over time is small. Further, the controller and the eye-examining device including the same in accordance with the present disclosure have an advantage that a mechanical structure for generating a restoring force is simple and easy to produce, and there are fewer occurrences of failures.

DETAILED DESCRIPTION

Hereinafter, the present disclosure will be described in detail with reference to the accompanying drawings.

Figure 2:
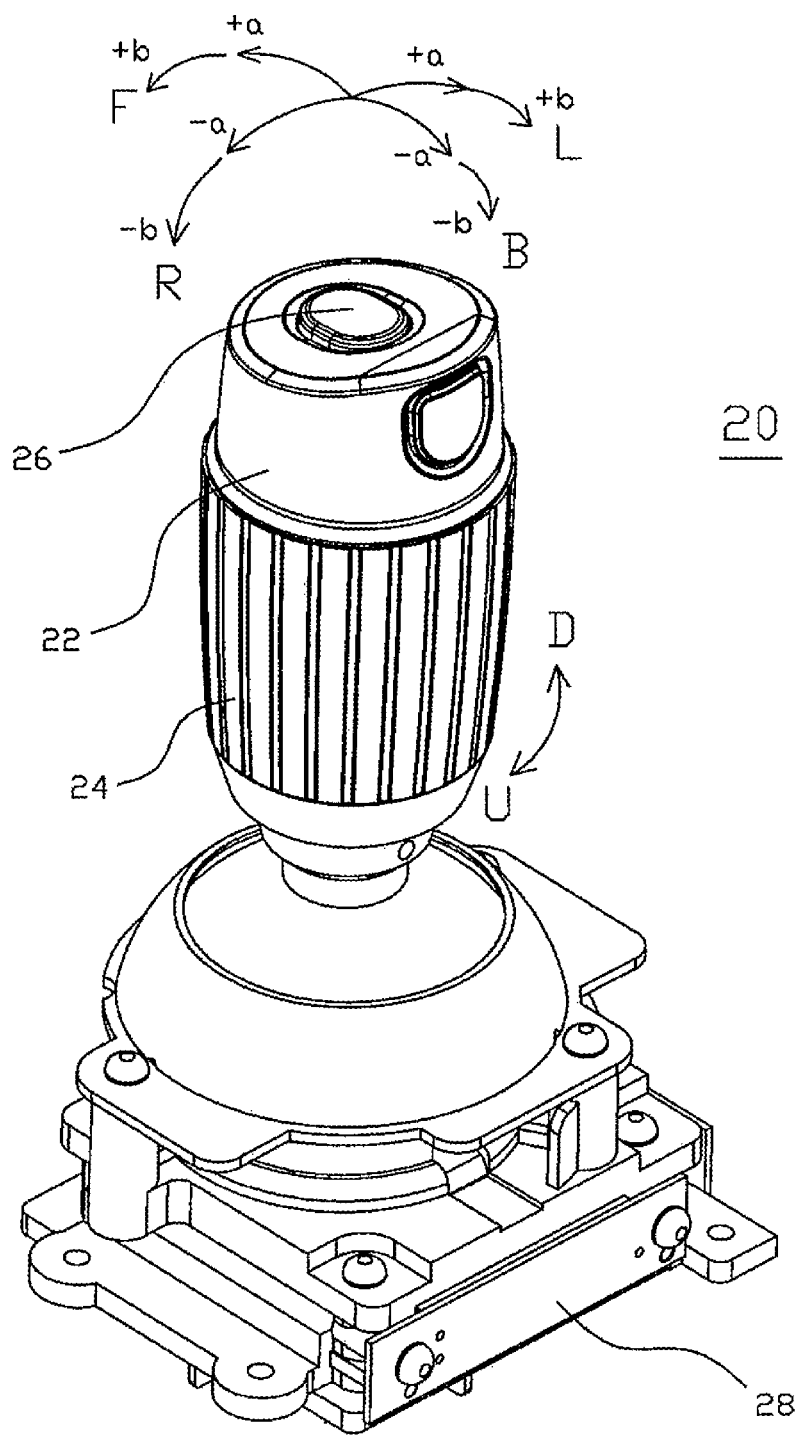
FIG. 2 is an external perspective view of a controller in accordance with one embodiment of the present disclosure.

FIG. 2 is an external perspective view of a controller in accordance with one embodiment of the present disclosure. The controller 20 in accordance with one embodiment of the present disclosure may generate a drive control signal for controlling a driving direction, a driving amount, and a driving speed of an examination unit 14 and drive the examination unit 14. As shown in FIG. 2, the controller 20 in accordance with the present disclosure may include an operation unit 22, for example, a stick operation unit 22, and a control signal generation unit 28, and may further include a rotary dial 24, a measurement button 26, and the like, as needed. A user may drive the examination unit 14 by operating the operation unit 22 and the rotary dial 24. For example, the examination unit 14 moves in the left and right R/L direction when the operation unit 22 is tilted in the left and right R/L direction, the examination unit 14 moves in the forward and backward F/B direction when the operation unit 22 is tilted in the forward and backward F/B direction, and the examination unit 14 moves in the up and down U/D direction when the rotary dial 24 is rotated in a clockwise or counterclockwise U/D direction. The measurement button 26 may be installed at the top of the operation unit 22, and examination, observation, and photographing operations of the examination unit 14 may be controlled using the measurement button 26.

The control signal generation unit 28 detects the positions of the operation unit 22, the rotary dial 24, and so on, and generates a drive control signal that drives the examination unit 14 and the drive unit according to the positions of the operation unit 22 and the rotary dial 24. The control signal generation unit 28 may be a conventional sensor such as a potentiometer, an encoder, or the like that generates an electrical signal having a corresponding intensity according to the positions of the operation unit 22 and the rotary dial 24. In the controller in accordance with the present disclosure, the operation unit 22 can drive the examination unit 14 in two different methods. For example, as shown in FIG. 2, a fine movement operation of driving the examination unit 14 at a slow speed may be performed when the tilt angle x of the operation unit 22 is within a predetermined range ($-a \leq x \leq +a$), and a coarse movement operation of driving the examination unit 14 at high speed may be performed when the tilt angle x of the operation unit 22 is greater than the predetermined range (e.g., $-b \leq x < -a$ and $+a < x \leq +b$, where a<b). In this way, if the controller outputs signals corresponding to two different driving states according to the position of the operation unit 22, it is necessary to automatically switch from one driving state to the other. For example, the operation unit 22 is kept in the coarse movement driving state by applying an external force to the operation unit 22, and when the external force applied to the operation unit 22 is removed, it is necessary for the tilt angle of the operation unit 22 to automatically return to the fine movement driving range so that the operation unit 22 is positioned in the fine movement driving state.

Figure 3:
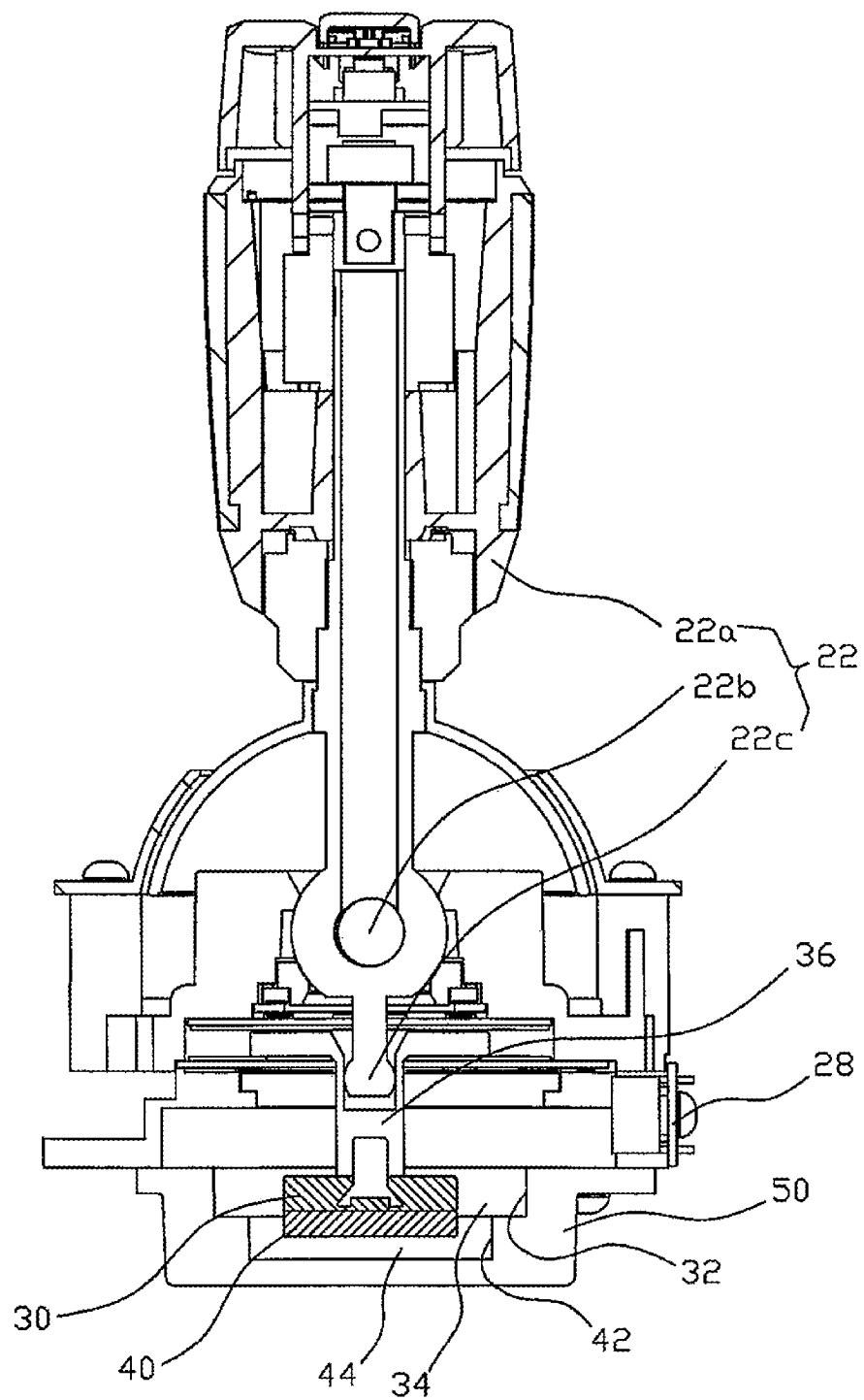
FIG. 3 is a cross-sectional view showing the internal structure of a controller in accordance with one embodiment of the present disclosure.
Figure 4:
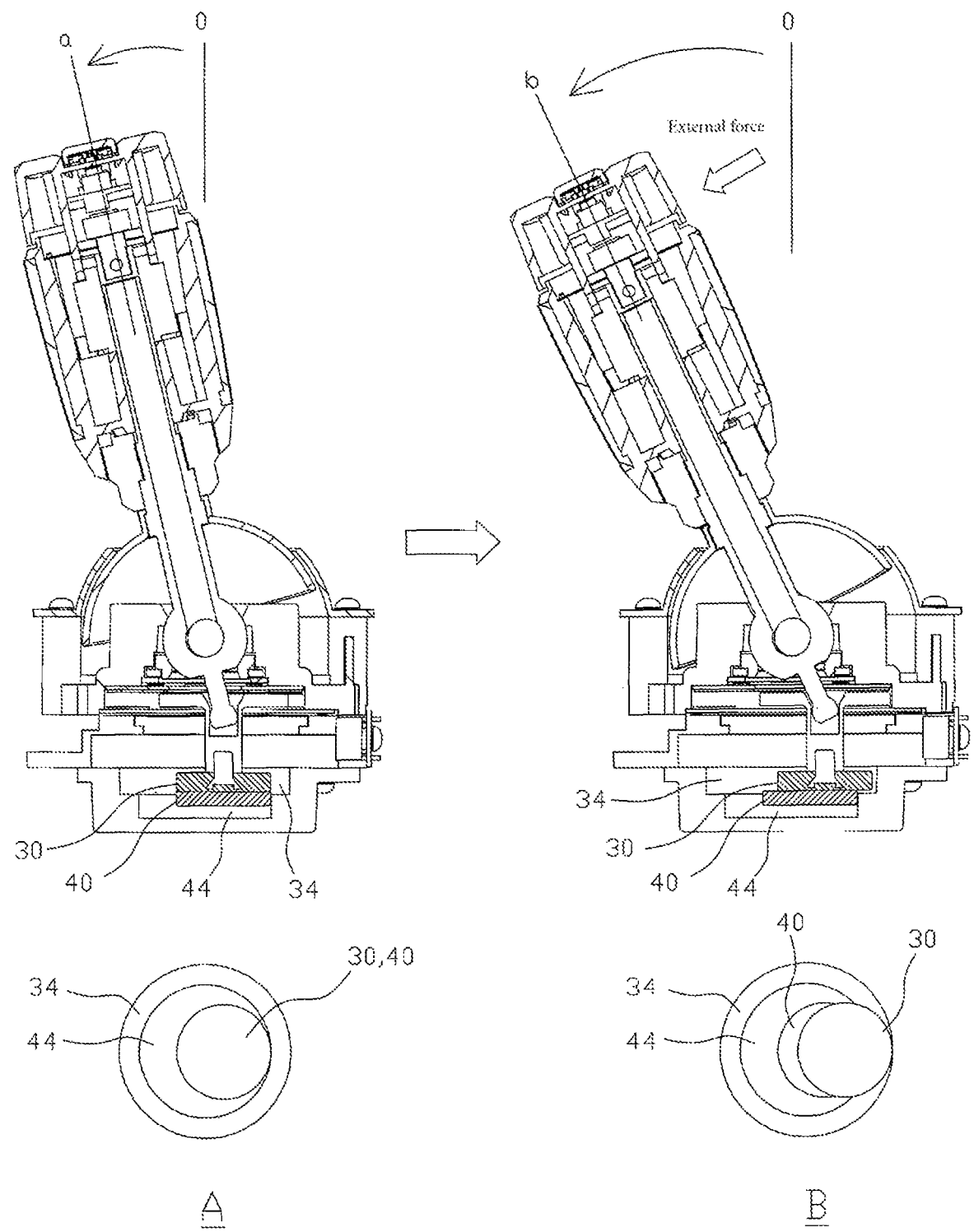
FIGS. 4 and 5 are cross-sectional views showing a state in which a controller in accordance with one embodiment of the present disclosure is operated in two different methods and a state in which it is restored, respectively.

FIG. 3 is a cross-sectional view showing the internal structure of a controller in accordance with one embodiment of the present disclosure. As shown in FIG. 3, the controller in accordance with the present disclosure includes an operation unit 22, a first magnetic coupling part 30, a second magnetic coupling part 40, and a control signal generation unit 28. The operation unit 22 is operated by a user to be positioned in a first driving area or a second driving area. The control signal generation unit 28 of the controller outputs a first drive control signal when the operation unit 22 is positioned in the first driving area, and the control signal generation unit 28 of the controller outputs a second drive control signal when the operation unit 22 is positioned in the second driving area. For example, as shown in FIG. 4, a fine movement control signal for driving the examination unit 14 at a slow speed may be outputted when the tilt angle x of the operation unit 22 is within a predetermined range ($0 \leq x \leq +a$, the second driving area) (A in FIG. 4), and a coarse movement control signal for driving the examination unit 14 at high speed may be outputted when the tilt angle x of the operation unit 22 is greater than the predetermined range (e.g., $+a < x \leq +b$, where a<b, the first driving area) (B in FIG. 4). The first magnetic coupling part 30 is coupled to the operation unit 22 and moves along a first area 34 together with the operation unit 22, and the second magnetic coupling part 40 is detachably coupled to the first magnetic coupling part 30 by magnetic force and moves along a second area 44. Here, the first area 34 includes the second area 44 so that the movement area of the first magnetic coupling part 30 can include the movement area of the second magnetic coupling part 40. The second magnetic coupling part 40 moves within the second area 44 according to the driving of the operation unit 22 while being coupled to the first magnetic coupling part 30 by magnetic force when the operation unit 22 is in the second driving area, the first magnetic coupling part 30 moves to the first area 34 outside the second area 44 when the operation unit 22 is in the first driving area by applying an external force to the operation unit 22, the second magnetic coupling part 40 and the first magnetic coupling part 30 are separated from each other since the second magnetic coupling part 40 cannot move out of the second area 44, and an attractive force resulting from the magnetic force is generated between the second magnetic coupling part 40 and the first magnetic coupling part 30. At this time, if the external force applied to the operation unit 22 is removed, the first magnetic coupling part 30 returns to the second area 44 by the attractive force between the second magnetic coupling part 40 and the first magnetic coupling part 30, and the operation unit 22 also returns to the second driving area.

In the present disclosure, the first magnetic coupling part 30 and the second magnetic coupling part 40 may be magnetic bodies that are coupled to each other when no external force is applied, may be, for example, neodymium magnets, preferably circular magnets having the same outer diameter, but are not limited thereto, and a variety of combinations that can be detachably coupled by magnetic force, such as a metal-magnet, may be used. When the first magnetic coupling part 30 and the second magnetic coupling part 40 are separated from each other by applying an external force to the first magnetic coupling part 30 and the second magnetic coupling part 40, an attractive force resulting from the magnetic force is generated between the first magnetic coupling part 30 and the second magnetic coupling part 40, and the first magnetic coupling part 30 and the second magnetic coupling part 40 returns to the initial coupled state by the attractive force when the external force separating the first magnetic coupling part 30 and the second magnetic coupling part 40 is removed.

The first magnetic coupling part 30 and the second magnetic coupling part 40 may be housed inside a housing 50, the first area 34 where the first magnetic coupling part 30 moves may be formed by a first inner wall 32 inside the housing 50, and the second area 44 where the second magnetic coupling part 40 moves may be formed by a second inner wall 42 inside the housing 50. The first area 34 and the second area 44 are adjacent to each other so that the first magnetic coupling part 30 and the second magnetic coupling part 40 can be detachably coupled, and are formed such that the first area 34 includes the second area 44.

The operation unit 22 may have various structures capable of moving the first magnetic coupling part 30 along the first area 34. For example, as shown in FIG. 3, the operation unit 22 may have a structure in which it rotates around a rotary shaft 22b, a handle 22a is formed at one end, a protrusion 22c that is slidably fitted into a fastening part 36 formed in the first magnetic coupling part 30 is formed at the other end, and a rotational motion that rotates the handle 22a with respect to the rotary shaft 22b induces a linear motion of the first magnetic coupling part 30 (see FIG. 4).

Figure 5:
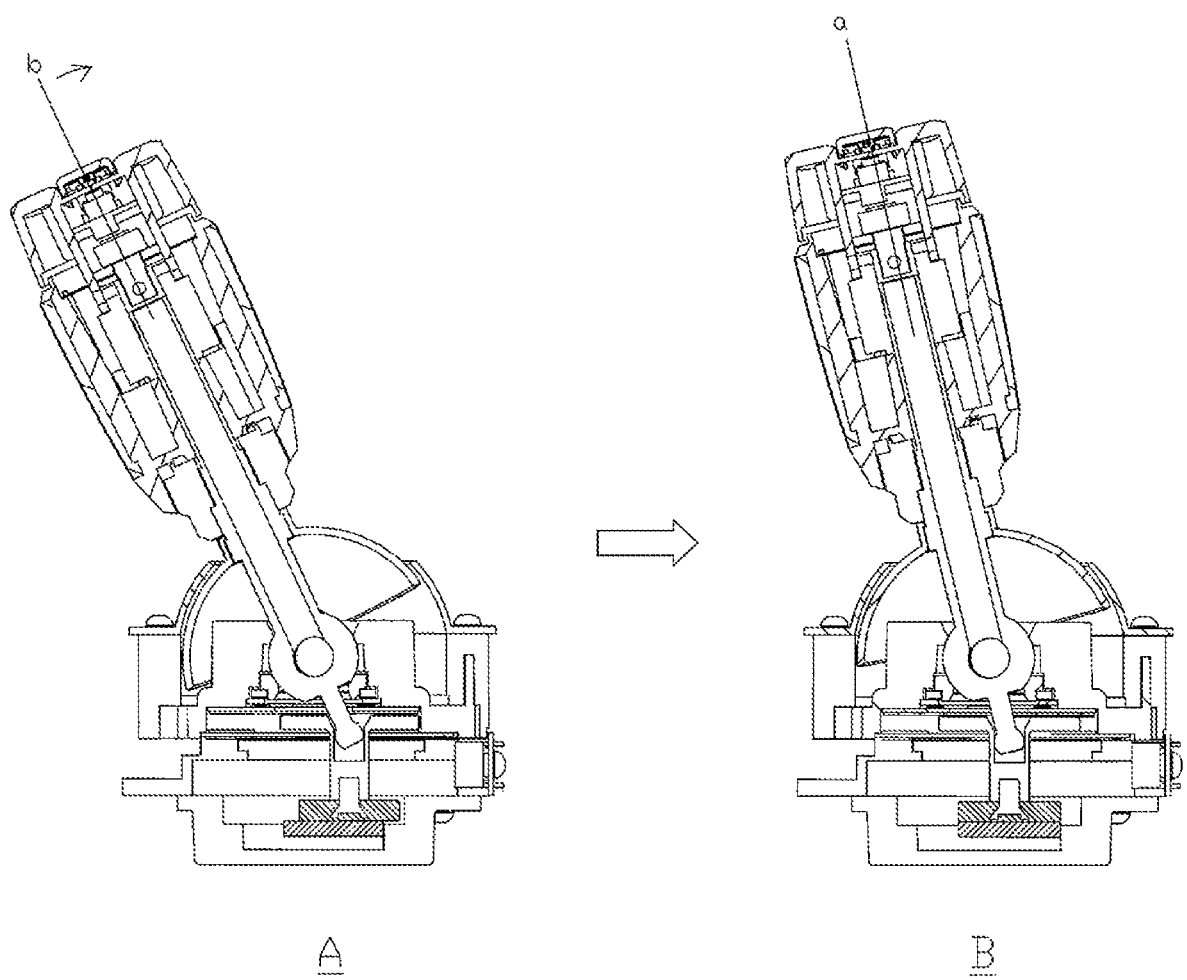

Next, the operation of the controller in accordance with the present disclosure will be described with reference to FIGS. 4 and 5. FIGS. 4 and 5 are cross-sectional views showing a state in which a controller in accordance with one embodiment of the present disclosure is operated in two different methods and a state in which it is restored, respectively. In FIG. 4, the drawings at the bottom are plan views showing the positional relationship between the first magnetic coupling part 30, the second magnetic coupling part 40, the first area 34, and the second area 44.

As shown in FIG. 4, when the operation unit 22 is positioned in the second driving area, for example, the tilt angle x of the operation unit 22 is within a predetermined range (0≤x≤+a) (A in FIG. 4), the first magnetic coupling part 30 and the second magnetic coupling part 40 are coupled to each other by magnetic force while being positioned in the second area 44, and the control signal generation unit 28 of the controller senses the position of the operation unit 22 and outputs a second drive control signal (e.g., a fine movement control signal). In this state, when the operation unit 22 is caused to be positioned in the first driving area, for example, when the tilt angle x of the operation unit 22 is greater than the predetermined range (e.g., +a<x≤+b, where a<b) by applying an external force to the operation unit 22 (B in FIG. 4), the first magnetic coupling part 30 is separated from the second magnetic coupling part 40 since the second magnetic coupling part 40 cannot move out of the second area 44 and is positioned in the first area 34 outside the second area 44, the control signal generation unit 28 of the controller senses the position of the operation unit 22 and outputs a first drive control signal (e.g., a coarse movement control signal). In other words, while the first magnetic coupling part 30 and the second magnetic coupling part 40 move inside the second area 44 in a state of being coupled to each other, when the first magnetic coupling part 30 is moved to the first area 34 outside the second area 44 by an external force, the first magnetic coupling part 30 and the second magnetic coupling part 40 are separated since the second magnetic coupling part 40 abuts against the second inner wall 42 of the housing 50 and cannot move any further, and an attractive force is generated between the first magnetic coupling part 30 and the second magnetic coupling part 40.

In this state, if the external force applied to the operation unit 22 is removed (A in FIG. 5), the first magnetic coupling part 30 returns to the second area 44 and couples with the second magnetic coupling part 40 by the attractive force between the first magnetic coupling part 30 and the second magnetic coupling part 40 (B in FIG. 5). The control signal generation unit 28 of the controller senses the position of the operation unit 22 and outputs a second drive control signal (e.g., a fine movement control signal). Therefore, when operating the operation unit 22, the operation unit 22 is restored to the position of 13.5 degrees if no external force is applied if the tilt angle x of the operation unit 22 is, for example, in the range of 13.5 degrees to 24.5 degrees. The ranges of the first driving area and the second driving area of the operation unit 22 can be readily changed by adjusting the sizes (areas) of the first area 34 and the second area 44 or adjusting the sizes of the first magnetic coupling part 30 and the second magnetic coupling part 40.

Figure 1:
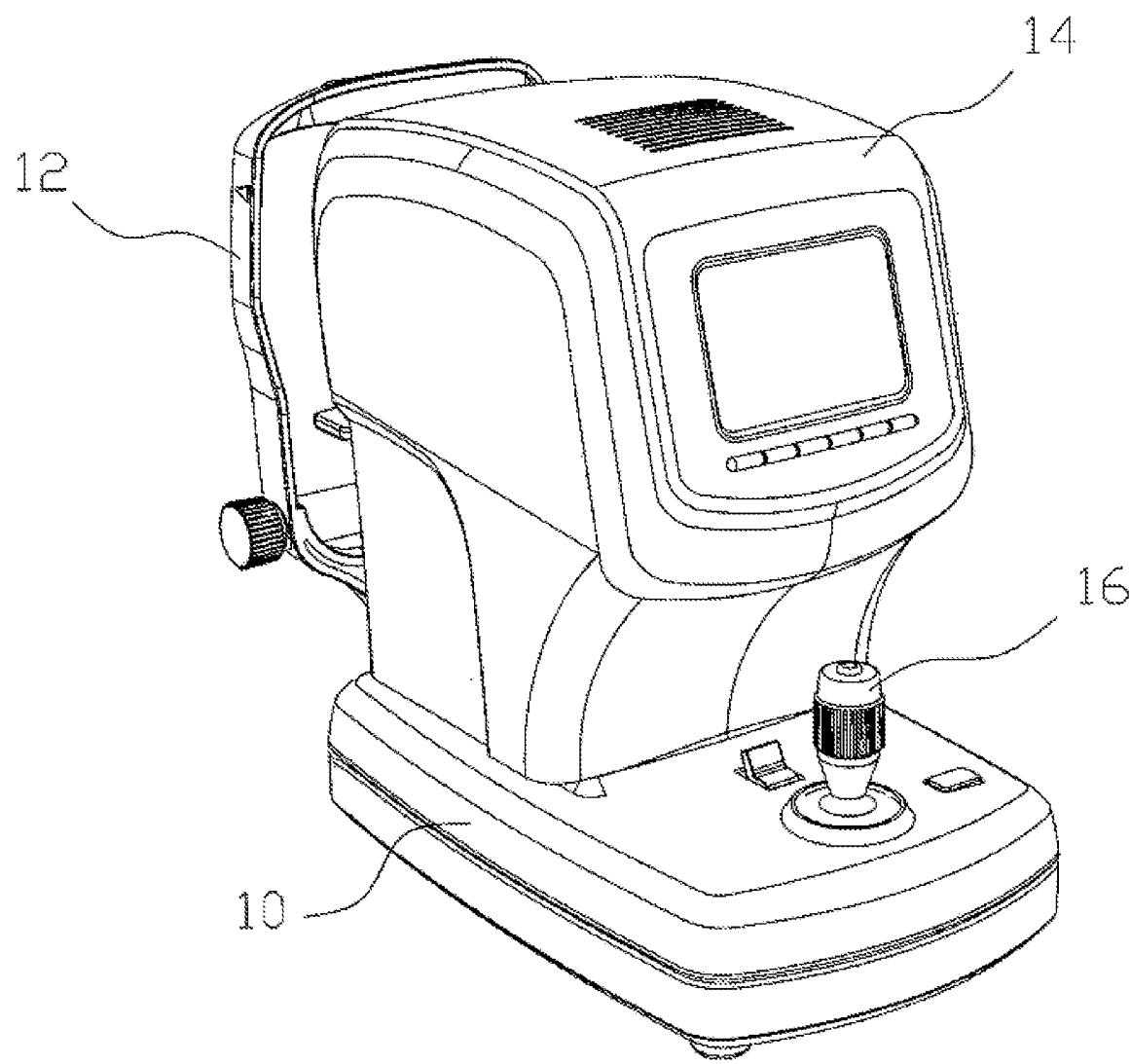
FIG. 1 is a view showing the configuration of a conventional eye-examining device.

The controller of the present disclosure can be used particularly suitably in an eye-examining device that adjusts the position of the examination unit with respect to the eye to be examined. Therefore, an eye-examining device in accordance with the present disclosure includes a base unit 10 having a headrest 12 for fixing the face of an examinee mounted thereto, an examination unit 14 that is mounted on the base unit 10 and moves in position with respect to the eye to be examined fixed to the headrest 12 and examines the eye to be examined, a drive unit (not shown) that is installed on the base unit 10 and moves the examination unit 14, and the controller 20 described above as a device that moves the examination unit 14 to a desired position by controlling the drive unit, as shown in FIG. 1.

The present disclosure relates to an operating device (joystick module) that is restored in position from a position greater than or equal to a certain angle to a specific angle by utilizing an attractive force of two magnets pulling each other and a positional relationship between the two magnets. According to the present disclosure, since it can automatically move to another driving area if no separate external force is applied when the operation unit 22 is in a predetermined driving area, it is possible to prevent the examination unit 14 from being driven against the user's intention.

Although the present disclosure has been described above with reference to the accompanying drawings and illustrative embodiments, the present disclosure is not limited to what is shown in the drawings and the embodiments described above. In the following claims, reference numerals are indicated to aid understanding, but the scope of the following claims should not be limited to what is shown by the reference numerals and in the drawings and should be construed to encompass all modifications, and equivalent constructions and functions of the illustrative embodiments.

What is claimed is:
1. A controller comprising:
an operation unit configured to be operated by a user so as to be positioned in a first driving area or a second driving area;

a first magnetic coupling part coupled to the operation unit and configured to move within a first area together with the operation unit; and a second magnetic coupling part detachably coupled to the first magnetic coupling part by magnetic force and configured to move within a second area, wherein the first area is larger than the second area so that a movement range of the first magnetic coupling part is larger than a movement range of the second magnetic coupling part, wherein the first magnetic coupling part and the second magnetic coupling part, while being coupled to each other by the magnetic force, move within the second area according to driving of the operation unit when the operation unit is in the second driving area, and wherein the first magnetic coupling part moves to an area outside the second area when the operation unit is in the first driving area, the first magnetic coupling part and the second magnetic coupling part are separated from each other, and an attractive force resulting from the magnetic force is generated between the second magnetic coupling part and the first magnetic coupling part.

2. The controller of claim 1, wherein the operation unit is moved to the first driving area by an external force, and the first magnetic coupling part returns to the second area by the attractive force between the second magnetic coupling part and the first magnetic coupling part when the external force is removed, and the operation unit also returns to the second driving area.

3. The controller of claim 1, wherein the first magnetic coupling part and the second magnetic coupling part are housed inside a housing, the first area where the first magnetic coupling part moves is formed by a first inner wall inside the housing, and the second area where the second magnetic coupling part moves is formed by a second inner wall inside the housing.

4. The controller of claim 1, wherein the first magnetic coupling part and the second magnetic coupling part are neodymium magnets that are coupled to each other when no external force is applied.

5. An eye-examining device comprising:
a base unit having a headrest for fixing a face of an examinee mounted thereto;
an examination unit mounted on the base unit and configured to move in position with respect to an eye to be examined fixed to the headrest and examine the eye to be examined; and
the controller of claim 1 to move the examination unit to a desired position on the base unit.

6. The eye-examining device of claim 5, wherein a fine movement control signal for driving the examination unit at a slow speed is outputted when the operation unit is positioned in the second driving area, and a coarse movement control signal for driving the examination unit at high speed is outputted when the operation unit is positioned in the first driving area.

\* \* \* \* \*